Figure 1:
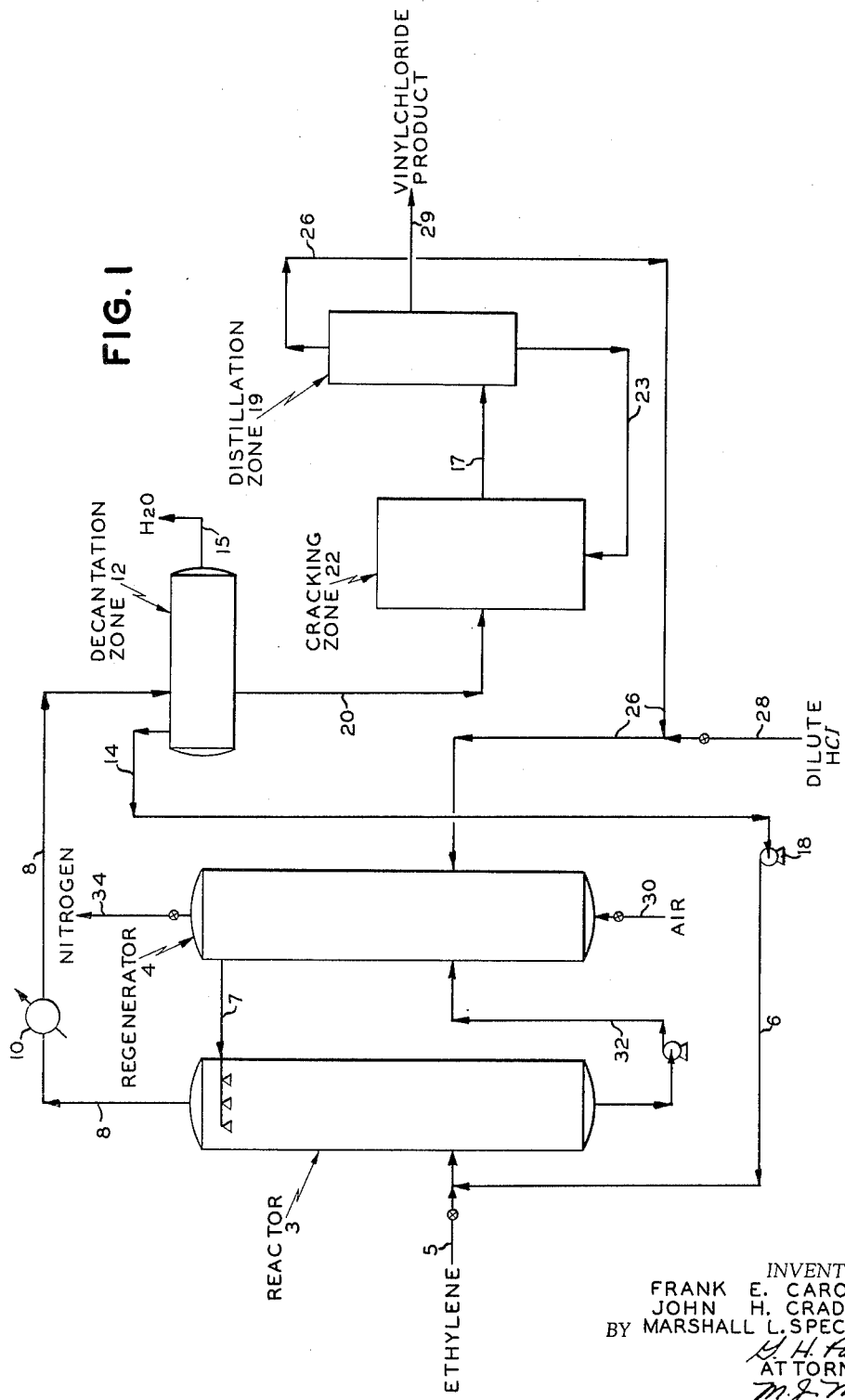

Oct. 26, 1965  F. E. CAROPRESO ET AL  3,214,482
PROCESS FOR THE HALOGENATION OF HYDROCARBONS
Filed June 1, 1962  2 Sheets-Sheet 1

INVENTORS
FRANK E. CAROPRESO
JOHN H. CRADDOCK
BY MARSHALL L. SPECTOR

*G. H. Palmer*
ATTORNEY
*M. J. Maue*
AGENT

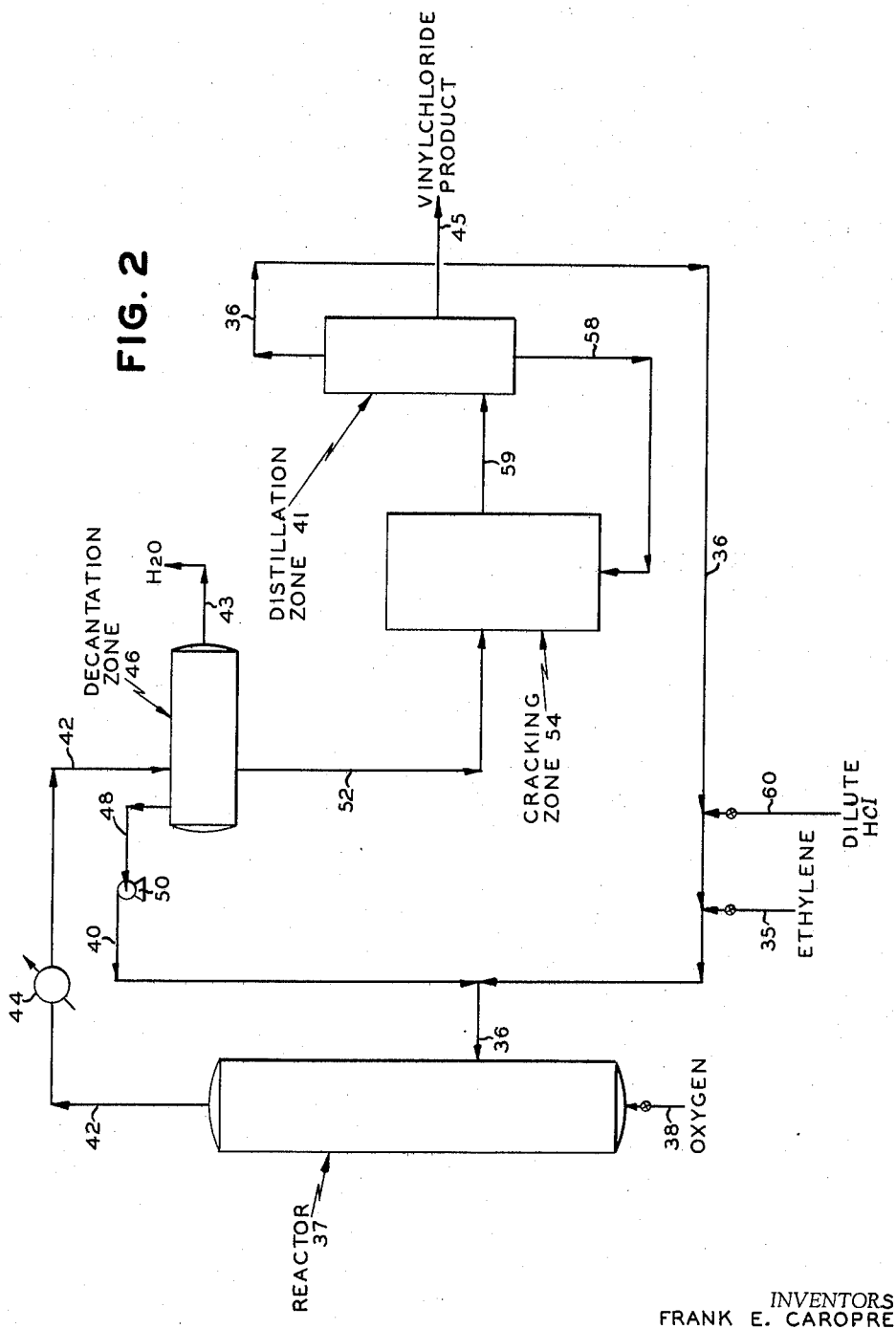

United States Patent Office 3,214,482
Patented Oct. 26, 1965

3,214,482
PROCESS FOR THE HALOGENATION OF HYDROCARBONS
Frank E. Caropreso, Staten Island, N.Y., and John H. Craddock, Newark, and Marshall L. Spector, Livingston, N.J., assignors to Pullman Incorporated, a corporation of Delaware
Filed June 1, 1962, Ser. No. 199,331
16 Claims. (Cl. 260—659)

This invention relates to the preparation of a metal halide catalyst for the halogenation of a hydrocarbon. In one aspect, this invention relates to the preparation of metal halide catalysts for the preparation of hydrogen halide in the oxidative halogenation of a hydrocarbon. Still another aspect of this invention relates to an improved process for the halogenation of a hydrocarbon.

The halogenation of hydrocarbons with oxygen or air and a hydrogen halide in the presence of a metal halide catalyst is a process of primary importance in the commercial production of halogenated hydrocarbons of both saturated and unsaturated types. The catalyst heretofore employed in these halogenation processes are most usually halides of metals having variable valences or oxy halides of these metals. As employed in these reactions, the catalysts are usually deposited on solid carriers such as pumice, various natural clays, kieselguhr, alumina or silica or any other attrition-resistant carrier material and the solid mass is employed in the chlorination of hydrocarbons either in a fixed or moving bed or in a fluidized state in a reaction zone.

The commercial success of these processes is due largely to the demand for halogenated compounds containing from 1 to 6 carbon atoms; however, there is a great need for improvement in these processes. For example, it would be highly desirable to reduce the contact time normally associated with fixed bed operation while eliminating the difficulties associated with fluidized solid operation such as catalyst attrition and catalyst vaporization which appears to be more pronounced with highly active catalysts. While the moving bed solves some of these difficulties, it is not without its own particular problems such as those derived from the mechanical transportation of catalyst throughout a zone and the existence of "hot spots" in the catalyst bed. The heat of reaction generated on the surface of the solid permits direct oxidation of the hydrocarbon to produce undesirable oxides of carbon.

The more active metal halide catalysts, such as, for example, ferric chloride are more volatile at required halogenation temperatures and thus, it is difficult to retain the catalyst in the system and maintain the activity of the catalyst mass over an extended period of time. In such systems the volatilized catalyst must be recovered by condensation or other troublesome methods and returned in a supported state to the reaction zone. Thus, the economics of operating with fluidized catalyst is poor in spite of the fact that such a system provides better temperature control and higher yield of product for a given period of operation.

It is, therefore, an object of the present invention to overcome the above difficulties by providing an economic and commercially feasible catalyst composition.

Another object of the present invention is to minimize the loss of metal halide catalyst due to volatilization.

Another object of the invention is to provide a process for the chlorination of hydrocarbons wherein an improved contact between hydrocarbon and catalyst is realized.

Still another object of this invention is to provide a metal halide catalyst composition which can be readily regenerated and reused in the chlorination of hydrocarbons.

These and other objects of the present invention will become apparent to those skilled in the art from the accompanying description and disclosure.

According to the present invention, an aqueous catalyst solution suitable for the halogenation of hydrocarbons, is prepared by dissolving or suspending ferric halide or a mixture of ferric halide as an active catalyst portion and a dissimilar halide of a metal, preferably having variable valence, such as a halide of titanium, tin, bismuth, chromium, aluminum, vanadium, zinc, mercury, iron, cobalt, molybdenum or nickel as the promoter portion in water, wherein the concentration of the total metal halide with respect to the liquid is between about 0.001 mol percent and about 50 mol percent, preferably between about 10 mole percent and about 30 mol percent. Halogenation reactions with such metal halide catalysts can be carried out at lower temperatures than heretofore employed, for example, halogenation of an olefin can be carried out at a temperature between about 120° C. and about 180° C., under pressure sufficient to maintain the catalyst liquid phase. Broadly, for the purposes of the present invention, the halogenation temperature employed may be as high as about 350° C., particularly in cases where a paraffin or an aromatically unsaturated compound is reacted. However, it is to be understood that higher temperatures can be employed if desired even though the conversion to halogenated hydrocarbon is not measurably improved. It is found that at higher temperatures, carbon dioxide is formed in the reaction which lowers the selectivity of the present process in the formation of halogenated product, and is particularly detrimental to the selectivity of 1,2-dichloroethane when ethylene is the hydrocarbon. Thus, the $CO_2$ formation should be maintained below 5 percent of the hydrocarbon feed. The pressures employed in the halogenation reactions can vary from atmospheric pressure up to about 1,000 p.s.i.g. or above, if desired; however, hydrocarbon pressures within the range of between about 20 p.s.i.g. and about 300 p.s.i.g. are found to be most advantageous.

The hydrocarbons suitable for the halogenation reactions described herein include saturated aliphatics such as methane, ethane, propane, butane, and hydrocarbons containing up to about 10 carbon atoms; unsaturated aliphatic hydrocarbons, such as ethylene, propylene, butylene, butadiene, isoprene and hydrocarbons containing up to about 10 carbon atoms including isomeric types; and aromatically unsaturated hydrocarbons such as benzene, toluene, xylene, styrene, etc. Of this group, the preferred hydrocarbons are the olefins containing from 2 to 5 carbon atoms and benzene, and most preferably, ethylene.

The halogenation reactions referred to herein include chlorination, bromination, and iodination; although in the case of iodination, olefins are the hydrocarbons halogenated. The most preferred reaction is that of chlorination. Accordingly, the metal halide catalysts of the present invention are preferably metal chlorides but can also be metal bromides or metal iodides.

As referred to above, for the purposes of the present invention, the catalyst can be a ferric halide or can comprise two distinct components, namely the active catalytic portion, ferric halide, as the first component and the promoting portion as the second component which may or may not be catalytically active, but which aids reaction by the attraction and release of a halogen ion. The promoting portion or second component is preferably a metal halide where the valence of the metal is variable, most preferably a chloride selected from the group consisting of bismuth, chromium, cobalt, iron, mercury, molybdenum, nickel, tin, titanium, manganese, or vanadium. It is to be understood, however, that halides selected from Groups IIB, IIIA, IVB, VB, VIB and iron, cobalt and nickel of Group VIII of the Periodic Table and mixtures thereof, can be suitably employed as the promoter portion of the catalyst. Within this group, most preferred catalyst systems include an aqueous solution of ferric chloride and an aqueous solution of ferric-chromic chloride. Higher members of Group VIII, having atomic numbers of 44 and above, lower the selectivity of the halogenated product in that they promote the formation of oxygenated compounds. Halides of these elements are, therefore, excluded.

In the chlorination of an olefinic hydrocarbon, preferably having from 2 to 5 carbon atoms in the presence of an aqueous solution of ferric chloride catalyst, the chlorination temperature is most preferably between about 125° C. and about 165° C., and the pressure employed is most preferably within the range of 60 p.s.i.g. to about 300 p.s.i.g. Generally, the chlorination of saturated hydrocarbons requires a higher temperature with some degree of cracking. Therefore, in these cases, temperatures between about 220° C. and about 350° C. are employed; and, for aromatically unsaturated hydrocarbons such as, for example, benzene, a temperature between about 180° C. and about 300° C. is preferably employed.

When ferric chloride is used as the active catalytic portion of the catalyst to chlorinate a hydrocarbon, the metal of the chloride, by giving up a chlorine atom, attains a lower valence state and becomes ferrous chloride. This spent mixture, when the concentration of the active catalytic portion falls below 90 percent of the original ferric chloride concentration in the solution is either removed from the reaction zone or is regenerated with hydrogen chloride and oxygen (or an oxygen-containing gas) to restore the active ferric chloride in a separate regeneration zone or is regenerated within the reaction zone. In the latter case, the chlorination of the hydrocarbon is carried out with ferric chloride solution or suspension, simultaneously with the oxygen and hydrogen chloride regeneration of the ferrous chloride formed.

As set forth above, the catalyst is dissolved or suspended in water for more intimate contact with reactants in the halogenation zone and as a means of conducting the halogenation reaction at lower temperature, avoiding vaporization of catalyst. In addition to the advantage of being able to conduct the halogenation reactions of the present process at lower temperatures, thereby avoiding oxidation of the hydrocarbon, the aqueous catalyst solutions allow for better overall temperature control in the reaction zone, which in the case of ethylene chlorination at from about 125° C. to about 165° C., results in high selectivity to the 1,2-dichloroethane product, a valuable chemical compound and intermediate in the formation of other desirable compounds. The hydrogen chloride and oxygen in the regeneration step are used to oxychlorinate the metal halide of lower valence state which may be the catalytically active component or the promoter component.

The aqueous catalysts systems also result in the conversion to halogenated hydrocarbons at a faster rate than heretofore obtainable.

In the chlorination of ethylene in the presence of an aqueous ferric chloride solution at a temperature not in excess of 185° C. a high selectivity of conversion to 1,2-dichloroethane (as high as 98 mol percent based on chlorinated product product) is obtainable. This compound is a valuable intermediate in the manufacture of vinyl chloride by pyrolysis of the saturated dichloride and thus the process using the catalyst of the present invention, at a temperature below 165° C., finds particular commercial value in the economical synthesis of this unsaturated chloride and provides a new process wherein the hydrogen chloride produced by the pyrolysis of the saturated compound can be used to at least partially regenerate the catalyst solution. It is to be understood that additional chlorine for regeneration purposes can be supplied as hydrogen chloride or chlorine feed. The hydrogen chloride concentration is limited to that required for regeneration in order to avoid excess hydrogen chloride being present, which would lead to the formation of ethyl chloride.

Another advantage of the present process employing the aqueous catalyst solutions is that an aqueous or dilute solution of hydrogen halide can be fed to the reaction zone in place of the dried, highly concentrated hydrogen halide employed heretofore. In the present process with water diluent, excess water is vaporized from the reaction zone by the heat of reaction while a portion of that generated serves to maintain the water content of the aqueous catalyst medium. It has also been found that with the catalyst solutions, little or no hydrogen halide is present in the gaseous reactor effluent.

Still another advantage of the present process is that the vapor pressure of the system can be controlled by the addition of promoter salts or certain inert salts such as, for example, sulfates of any of the promoter metals mentioned above, e.g., ferric sulfate or chromic sulfate. When the vapor pressure of the catalyst solution is reduced, adiabatic conditions may be achieved at lower pressure at a given percent conversion per pass, or, at a given total pressure, a lower conversion per mass is required.

The apparatus in which the aqueous metal halide catalyst solution is employed, should be composed of, or lined with, acid-resistant materials in order that the catalytic solution will not cause corrosion problems in the system. For example, glass or ceramic-lined equipment is suggested as being both inexpensive and readily available for this type of reaction.

For a better understanding of the process of the present invention, reference is now had to the accompanying drawings which illustrate specific embodiments of the process but which are not to be construed in any way limiting to the scope of the invention.

FIGURE 1 illustrates a process wherein halogenation and catalyst regeneration are carried out in separate zones, namely reactor 3 and regenerator 4. In this operation, air, in place of oxygen can be used as the regeneration gas since the inerts associated therewith (e.g. nitrogen and argon) can be prevented from entering the reactor and causing pressure build up in the system.

According to the process of FIGURE 1, ethylene is introduced by means of valved feed line 5 and recycle line 6 (hereinafter described) into reactor 3 in contact with an aqueous solution of ferric chloride at a rate of 2 gram mols to 200 gram mols of ethylene per liter of catalyst solution per hour. By way of example, 10.0 gram mols per hour of ethylene is fed per hour per liter of 6 molar ferric chloride catalyst aqueous solution entering the reactor from line 7 at a temperature of 150° C. under 125 p.s.i.g. The vaporous reactor effluent containing chlorinated product and unreacted components (e.g. 1.0 gram mol per liter per hour of 1,2-dichloroethane; 0.01 gram mol per liter per hour of monochloroethane; 9.0 gram mols per liter per hour of ethylene; and 4.7 gram mols per liter per hour of steam) is withdrawn from reactor 3 by means of line 8 and passed to condenser 10 and then into decanting zone 12 wherein gaseous and liquid phases are separated, at a temperature between about 25° C. and about 80° C. (e.g. 40° C.) under from about 90 p.s.i.g. to about 120 p.s.i.g. or approximately the reactor pressure. In the present case, three phases are formed in the decantation zone, namely, a gaseous phase comprising ethylene and monochlorethane; a liquid water phase and a liquid 1,2-dichloroethane phase. The gaseous phase is withdrawn from the decanting zone at a rate of about 9.1 gram mols per liter of catalyst per hour in reactor 3, passed through line 14 and line 6 through pump 18 and recycled to reactor 3 as a part of the feed thereto. The aqueous liquid phase is removed by way of line 15 and discarded. The liquid chlorinated hydrocarbon phase is withdrawn from the decantation zone by means of line 20 and passed to cracking zone 22 wherein at a temperature of between about 480° C. and about 580° C., under from about 0 p.s.i.g. to about 100 p.s.i.g. (in the present case, at a temperature of 550° C. under 50 p.s.i.g.), the 1,2-dichloroethane is converted to vinyl chloride in between about 25 mol percent to about 85 mol percent conversion per pass, e.g., 60 mol percent conversion per pass.

The product mixture from cracking zone 22 is passed to distillation zone 19 by means of line 17. It is to be understood that distillation zone 19 may comprise one or more separate fractionating steps performed in one or several columns. Vaporous hydrogen chloride is withdrawn in line 26 from the distillation zone and recycled to regenerator 4, together with dilute hydrogen chloride feed entering line 26 from valved feed line 28. Unconverted dichloroethane is withdrawn from zone 19 by line 23 and recycled to cracking zone 22, while vinyl chloride product is withdrawn from zone 19 by means of line 29 as the product of the process. The hydrogen chloride separated in distillation zone is withdrawn at a rate of 1 mol per mol of 1,2-dichloroethane reacted. Make-up hydrogen chloride feed and hydrogen chloride from zone 19 is passed to zone 4 with an acid concentration of between about 22 weight percent and about 35 weight percent (e.g. 33 weight percent acid concentration). Air, at a rate of about 2.5 gram mols per liter of catalyst per hour is introduced into regenerator 4 by means of valved line 30 and the oxygen in the air reacts with the dilute hydrogen chloride and ferrous chloride to produce ferric chloride. This regenerates the ferrous-ferric chloride catalyst to its original activity. In operating this process, the mol ratio of ferric chloride to ferrous chloride should not be permitted to fall to the point where activity is significantly diminished. The spent catalyst is introduced into regenerator 4 at a rate of 2.3 volumes per hour per volume of catalyst in reactor 3 by means of line 32. The regenerator is operated at a temperature of from about 130° C. to about 150° C. under from about 125 p.s.i.g. to about 120 p.s.i.g. or at approximately reactor conditions; in the present case, at a temperature of 150° C. under 125 p.s.i.g. The regenerated ferric chloride aqueous solution, the concentration of which is adjusted by the water content of dilute acid from line 28, is then recycled to reactor 3 by means of line 7 through spray heads in the upper part of the tower and inert gases such as, for example, nitrogen, and argon which enter the system in the air feed stream are vented to the atmosphere from the top of the regenerator through valved line 34.

Although the above process utilizes an aqueous ferric chloride catalyst to produce 1,2-dichloroethane as an intermediate and vinyl chloride as an end product, it is to be understood that an aqueous ferric bromide catalyst can be substituted in the above description to produce 1,2-dibromo-ethane as an intermediate and vinyl bromide as the end product. In this case, however, hydrogen bromide in place of the hydrogen chloride is used to regenerate the ferric-ferrous bromide in regenerator 4.

FIGURE 2 of the drawings illustrates a proces wherein chlorination of a hydrocarbon and catalyst regeneration of the catalyst solution is conducted in the same zone. The following embodiment is described in reference to chlorination; however, it is to be understood that the substitutions discussed above are also applicable in this embodiment of the process.

Ethylene feed entering valved line 35 at a rate of 1.0 gram mols per liter of catalyst solution per hour is passed to line 36 wherein it is admixed with 2.0 gram mols per hour of aqueous hydrogen chloride of 32 weight percent and 9.0 gram mols per liter of catalyst per hour of ethylene recycle from line 40 (hereinafter described). This mixture is then passed into reactor 37 wherein, in the presence of 0.5 gram mol of molecular oxygen per liter of catalyst entering zone 37 from valved line 38, the ethylene is reacted with ferric chloride of an aqueous 6 molar ferric chloride catalyst. The temperature in the reaction zone is maintained at about 150° C. and about 95 p.s.i.g. and is imposed on the mixture in zone 37. By maintaining the above amount of molecular oxygen and hydrogen chloride in this zone, the concentration of ferric chloride is maintained at a steady state, and a 10 percent conversion of ethylene to chlorinated product, of which, more than 90 weight percent is 1,2-dichloroethane, is obtained as a gaseous effluent in admixture with unconverted ethylene.

The gaseous effluent is withdrawn by means of line 42, passed to condenser 44 operated at a temperature preferably between about 25° C. and about 60° C. (e.g. 40° C.) and the resulting condensate introduced into decantation zone 46 wherein at a temperature of 40° C. under 95 p.s.i.g., unconverted ethylene gas is separated in line 48 from 1,2-dichloroethane. Water is withdrawn as a separate liquid phase in line 43 and removed from the process.

The ethylene gas is withdrawn from zone 46 in line 48, is pressured in pump 50 and recycled to the reaction zone 37 by means of lines 40 and 36 as hereinabove described. The liquid 1,2-dichloroethane is withdrawn from zone 46 by means of line 52 and passed to cracking zone 54 wherein at a temperature of about 550° C. under 50 p.s.i.g., 1,2-dichloroethane is converted to vinyl chloride and hydrogen chloride in about 60 mol percent per pass. The cracked mixture is then passed by means of line 59 to distillation zone 41 wherein the components of the cracked mixture are separated. Hydrogen chloride is withdrawn as vapor in line 36 and recycled to reactor 37, together with ethylene feed entering line 36 from valved line 35, and dilute hydrogen chloride feed (20–35 weight percent) entering line 36 from valved line 60. Unconverted liquid 1,2-dichloroethane is withdrawn from zone 41 and recycled to zone 54 by means of line 58 and the vinyl chloride is recovered from zone 41 as the product of the process by means of line 45. The dilute hydrogen chloride introduced into line 36 serves to maintain required hydrogen chloride feed to the reactor. The concentration of the hydrogen chloride is varied to maintain the water balance in the reactor.

Many modifications of the above-described embodiments illustrated in FIGURES 1 and 2 will become apparent to those skilled in the art. For example, any of the previously disclosed promoters, particularly $CrCl_3$, $HgCl$, $AlCl_3$, $TiCl_3$, $VCl_3$ and $MnCl_2$ can be added to the ferric chloride in the above catalyst system. It is also to be understood in processes using gaseous hydrocarbon that the hydrocarbon may be passed through the aqueous catalyst solution or the aqueous catalyst can be sprayed through the gaseous hydrocarbon phase. The examples which follow are set forth to show the effect of various concentrations in the catalyst system and to provide examples of other hydrocarbons which may be halogenated according to the teachings of this process. However, these examples should not be construed to limit the scope of the present invention.

*Example 1*

To 3 liters of aqueous 6 M $FeCl_3$–1 M $MnCl_2$ catalyst contained in a glass-lined pressure vessel, is passed 4.6 mols of ethylene per hour. At a temperature of about 160° C. and a total pressure of 300 p.s.i.g. Under these conditions 15 mol percent of the ethylene is converted per pass to 1,2-dichloroethane with a selectivity for the 1,2-dichloroethane greater than 90 percent.

*Example 2*

Ethylene is passed through 1 liter of an aqueous 6 M $FeCl_3$–1 M $CrCl_3$ solution contained in a glass reactor at a rate of 1.9 moles per hour. At a temperature of 160° C. under 300 p.s.i.g., 4 mol percent of the ethylene is converted per pass to 1,2-dichloroethane. The selectivity to the dichloroethane is about 90 percent.

The salts in the above catalyst combination reduce the water vapor pressure of the system to about 45 percent that of pure water. This reduction in the vapor pressure of water is important in that the system is adiabatic at the reduced pressure, and at a lower conversion per pass.

*Example 3*

Into a glass reactor containing 1 liter of aqueous 6 M FeBr₃ is passed C₂H₄ at a rate of 1.6 moles per hour. The total pressure over the system is 300 p.s.i.g. and the temperature 165° C. The conversion to 1,2-dibromoethane is 2 mol percent per pass with selectivity in excess of 80 percent.

*Example 4*

To a glass reactor containing 1 liter of aqueous 6 M ferric chloride was passed ethylene gas at a rate of 1.7 mols per hour. At 165° C., and a total pressure of 300 p.s.i.g., the conversion per pass of ethylene was 0.7 mol percent with a 50 percent selectivity to 1,2-dichloroethane and a 50 percent selectivity to ethyl chloride.

*Example 5*

To a glass reactor containing 1 liter of equeous 6 M FeCl₃ was passed ethylene gas at a rate of 1.2 mols per hour at 180° C. and at a total pressure of 300 p.s.i.g. The conversion of ethylene was 2 mol percent per pass. The product distribution was 95 percent to ethyl chloride and 5 percent to 1,2-dichloroethane.

*Example 6*

To a glass reactor containing 1 liter of aqueous 6 M FeCl₃–1 M CrCl₃ was passed ethylene gas at a rate of 1.3 mols per hour. At 165° C., under a total pressure of 300 p.s.i.g., the conversion of ethylene was 4.5 mol percent per pass. The selectivity was 38 percent with respect to 1,2-dichloroethane and 62 percent with respect to ethyl chloride.

*Example 7*

To a glass reactor containing 1 liter of aqueous 6 M FeCl₃–1 M ZnCl₂ is passed 1.3 mols of ethylene per hour. The temperature is 175° C. and the total pressure is 300 p.s.i.g. The conversion of ethylene is 2 mol percent per pass and 1,2-dichloroethane is produced in a yield above 50 percent of the chlorinated product mixture.

*Example 8*

To a glass reactor containing 1 liter of aqueous 4 M FeCl₃–2 M CrCl₃ is passed 1.3 mols of ethylene per hour. The temperature is 160° C. and the total pressure is 300 p.s.i.g. The conversion of ethylene is 3 mol percent per pass and 1,2-dichloroethane is more than 50 percent of the chlorinated product.

*Example 9*

To a glass reactor containing 1 liter of aqueous 3 M FeCl₃–3 M ZnCl₂ is passed 1.6 mols of ethylene per hour. The temperature is 160° C. and the total pressure is 300 p.s.i.g. The conversion of ethylene is 3 mol percent per pass and the selectivity to 1,2-dichloroethane is about 90 percent.

*Example 10*

To a glass reactor containing 1 liter of aqueous 6 M FeCl₃ and 1 M AlCl₃ is passed 0.6 mol of propylene per hour. The temperature is 160° C. and the total pressure is 300 p.s.i.g. The conversion of proylene is 1 percent per pass and the selectivity to 1,2-dichloropropane is 80 percent.

*Example 11*

To a glass-lined autoclave containing 1 liter of aqueous 6.6 M FeCl₃ is added 0.5 mol of benzene. The temperature is raised to 190° C. and held there for 16 hours. The conversion of benzene is 50 percent to mono- and dichlorinated benzene.

*Example 12*

To a glass-lined reactor containing aqueous 4 M FeCl₃–1 M TiCl₄ is passed 1 mole of butadiene per hour. The temperature is 160° C. and the total pressure is 200 p.s.i.g. The conversion per pass to dichlorinated product is 2 mol percent.

Having thus described our invention we claim:

1. A process for producing a halogenated hydrocarbon which comprises reacting in a reaction zone at a temperature of at least 120° C., an olefin having from 2 to 10 carbon atoms with an aqueous solution of ferric halide and a promoter selected from the group consisting of the corresponding halide manganese, titanium, tin, bismuth, chromium, aluminum, vanadium, zinc, cadmium, mercury, molybdenum, iron in the ferrous state, cobalt and nickel and mixtures thereof wherein the halogen of the ferric halide and the promoter has an atomic number above 9 in the Periodic Table and wherein the concentration of the total ferric halide-metal halide promoter in solution is between about 10 mol percent and about 50 mol percent; maintaining the aqueous ferric halide-halide promoter solution in the reaction zone; and withdrawing from the reaction zone a gaseous effluent containing the corresponding halogenated hydrocarbon product.

2. The process of claim 1 wherein the mol ratio of iron halide is at least as high as 1:1 with respect to the metal halide promoter.

3. A process for producing a halogenated paraffin which comprises reacting in a reaction zone at a temperature of at least 120° C., an olefin having from 2 to 10 carbon atoms with an aqueous solution of ferric halide and a promoter selected from the group consisting of the corresponding halide of manganese, titanium, tin, bismuth, chromium, aluminum, vanadium, zinc, cadmium, mercury, iron in the ferrous state, cobalt, molybdenum, nickel and mixtures thereof wherein the halogen of the ferric halide and the promoter has an atomic number above 9 in the Periodic Table and wherein the concentration of the total ferric halide-metal halide promoter in solution is between about 10 mol percent and about 50 mol percent, the proportion of ferric halide to promoter is maintained between about 0.01:1 and about 100:1; maintaining the aqueous ferric halide-halide promoter solution in the reaction zone; and withdrawing from the reaction zone a gaseous effluent containing the corresponding halogenated paraffin product.

4. A process for producing a dichlorinated paraffin which comprises reacting at a temperature of at least 120° C., a hydrocarbon olefin containing from 2 to 5 carbon atoms with an aqueous solution of ferric chloride and a promoter selected from the group consisting of a chloride of manganese, titanium, tin, bismuth, chromium, aluminum, vanadium, zinc, cadmium, mercury, iron in the ferrous state, cobalt, molybdenum and nickel and mixtures thereof wherein the concentration of the ferric chloride-chloride promoter is between about 10 mol percent and about 30 mol percent; maintaining the inorganic chlorides in aqueous solution in the reaction zone; and withdrawing a gaseous effluent from the reaction zone containing the dichlorinated product and recovering the dichlorinated product as the product of the process.

5. A process for producing a 1,2-dihaloethane which comprises: reacting ethylene in a reaction zone at a temperature of at least 120° C. with an aqueous solution of ferric halide and promoter selected from the group consisting of the corresponding halide of manganese, titanium, tin, bismuth, chromium, aluminum, vanadium, zinc, cadmium, mercury, iron in the ferrous state, cobalt, molybdenum and nickel and mixtures thereof wherein the halogen of the ferric halide and the promoter has an atomic number above 9 in the Periodic Table and, wherein the concentration of the total ferric halide-metal halide promoter in solution is between about 10 mol percent and about 50 mol percent, the proportion of ferric halide to promoter being maintained between about 0.1:1 and about 10:1; maintaining the ferric halide-halide promotor in aqueous solution in the reaction zone; withdrawing a gaseous effluent from the reaction zone containing unreacted ethylene and the corresponding 1,2-dihaloethane and condensing water and the 1,2-dihaloethane from the gaseous mixture; separating the unreacted ethylene as vapors from the remaining liquid 1,2-dihaloethane and water; regenerating with oxygen and the hydrogen halide the ferric halide-promoter solution.

6. The process of claim 5 wherein the ferric halide promoter solution is regenerated before the ferric chloride falls below 90 percent of its original concentration.

7. The process of claim 5 wherein the ferric halide-promoter solution is an aqueous solution of ferric-chromic chloride, the 1,2-dihaloethane is 1,2-dichloroethane.

8. The process of claim 5 wherein the halogenation reaction and the regeneration reaction are performed simultaneously in the same zone in the presence of molecular oxygen.

9. A process for producing a 1,2-dihaloethane which comprises: reacting ethylene in a reaction zone at a temperature of at least 120° C. with an aqueous solution of ferric halide and promoter selected from the group consisting of the corresponding halide of manganese titanium tin, bismuth, chromium, aluminum, vanadium, zinc, cadmium, mercury, iron in the ferrous state, cobalt, molybdenum and nickel and mixtures thereof wherein the halogen of the ferric halide and the promoter has an atomic number above 9 in the Periodic Table, wherein the concentration of the total ferric halide-metal halide promoter in solution is between about 10 mol percent and about 50 mol percent, the proportion of ferric halide to promoter being between about 0.1:1 and about 10:1; maintaining the ferric halide-halide promoter in aqueous solution in the reaction zone; withdrawing a gaseous effluent from the reaction zone containing unreacted ethylene and 1,2-dihaloethane and condensing 1,2-dihaloethane from the gaseous effluent; separating the unreacted ethylene as vapors from the liquid 1,2-dihaloethane; withdrawing as a spent halide mixture, the catalyst mixture from the reaction zone and passing the spent halide mixture to a separate regeneration zone wherein the ferric halide is restored to its original concentration by halogenation in the presence of an oxygen-containing gas and hydrogen halide and recycling the regenerated catalyst solution to the reaction zone.

10. The process of claim 9 wherein the ferric halide-promoter solution is an aqueous solution of ferric-manganese chloride, the 1,2-dihaloethane is 1,2-dichloroethane, the hydrogen halide is hydrogen chloride and the reaction of ethylene with the ferric-manganese chloride solution is effected at a temperature of from about 120° C. to 180° C.

11. The process of claim 9 wherein the concentration of the total ferric halide-promoter halide mixture in solution is adjusted by the addition of a dilute hydrogen halide feed stream to the regenerator zone.

12. A process for producing a chlorinated hydrocarbon containing from 2 to 10 carbon atoms which comprises: reacting, in a reaction zone at a temperature of at least 120° C., an olefin having from 2 to 10 carbon atoms with an aqueous solution of ferric chloride and a promoter selected from the group consisting of the chloride of manganese, titanium, tin, bismuth, chromium, aluminum, vanadium, zinc, cadmium, mercury, iron in the ferrous state, cobalt, molybdenum and nickel mixtures thereof, wherein the concentration of the total ferric chloride-metal chloride promoter in solution is between about 10 mol percent and about 50 mol percent, the proportion of ferric chloride to promoter being maintained between about 0.01:1 and about 100:1; maintaining the aqueous ferric chloride-chloride promoter solution in the reaction zone; withdrawing a gaseous effluent from the reaction zone containing unreacted olefin, and the corresponding chlorinated hydrocarbon product; and recovering the chlorinated hydrocarbon from the system.

13. The process of claim 12 wherein the aqueous solution of ferric chloride and promoter is sprayed through the gaseous phase of the hydrocarbon.

14. A process for producing 1,2-dichloroethane which comprises: reacting ethylene at a temperature of between about 120° C. and about 180° C. in a chlorination zone, with an aqueous solution of ferric chloride and a promoter selected from the group consisting of a chloride of manganese, titanium, tin, bismuth, chromium, aluminum, vanadium zinc, mercury, iron in the ferrous state, cobalt, molybdenum and nickel and mixtures thereof wherein the concentration of the total ferric chloride-chloride promoter in solution is between about 10 mol percent and about 30 mol percent; maintaining the ferric chloride-chloride promoter in aqueous solution in the reaction zone; withdrawing a gaseous effluent from the reaction zone containing unreacted ethylene and 1,2-dichloroethane; condensing 1,2-dichloroethane from the gaseous effluent and separating the unreacted ethylene as vapors from the liquid 1,2-dichloroethane.

15. The process of claim 14 wherein hydrogen chloride together with oxygen is employed to adjust the concentration of ferric chloride in solution and to regenerate the ferric chloride when the concentration of the ferric chloride falls below 90 percent of its original concentration.

16. A process for producing 1,2-dichloroethane which comprises: reacting ethylene at a temperature of between about 120° C. and about 180° C. in a chlorination zone, with an aqueous solution of ferric chloride and a promoter selected from the group consisting of a chloride of manganese, titanium, tin, bismuth, chromium, aluminum, vanadium, zinc, mercury, iron in the ferrous state, cobalt, molybdenum and nickel and mixtures thereof, wherein the concentration of the total ferric chloride-chloride promoter in solution is between about 10 mol percent and about 30 mol percent and the mol ratio of ferric chloride with respect to chloride promoter is maintained at least as high as 1:1, maintaining the ferric chloride-chloride promoter in the aqueous solution in the reaction zone, and recovering 1,2-dichloroethane with a selectivity of more than about 80 percent, based on chlorinated product, from the reaction zone as the product of the process.

References Cited by the Examiner

UNITED STATES PATENTS

| | | | |
|---|---|---|---|
| 2,287,244 | 6/42 | Heinemann | 252—441 |
| 2,399,488 | 4/46 | Hearne | 260—659 |
| 2,644,846 | 7/53 | Johnson et al. | 260—659 |
| 2,755,315 | 7/56 | Eberly | 260—565 |
| 2,779,805 | 1/57 | Millard | 260—654 |
| 2,809,221 | 10/57 | Thomas et al. | 260—654 |
| 2,822,410 | 2/58 | Wojcik et al. | 260—654 |
| 2,875,255 | 2/59 | Eberly | 260—656 |
| 2,915,565 | 12/59 | Jacobowsky et al. | 260—654 |
| 3,055,955 | 9/62 | Hodges | 260—659 |
| 3,079,444 | 2/63 | Jacobowsky et al. | 260—654 |

FOREIGN PATENTS

| | | |
|---|---|---|
| 451,379 | 9/43 | Canada. |
| 517,009 | 9/55 | Canada. |
| 254,536 | 12/48 | Switzerland. |

OTHER REFERENCES

"Handbook of Chemistry and Physics" 36th edition, (1954–1955), pp. 528–9.

Kovacic et al.: "J. Am. Chem. Soc.," vol. 76 (October–December 1954), pp. 5491–4.

LEON ZITVER, *Primary Examiner.*